United States Patent Office 3,637,747
Patented Jan. 25, 1972

3,637,747
3-(2-AMINOPHENYL) INDOLE DERIVATIVES
Jules Freedman, Thiensville, and Claude I. Judd, Mequon, Wis., assignors to Colgate-Palmolive Company, New York, N.Y.
No Drawing. Filed Apr. 30, 1969, Ser. No. 820,675
Int. Cl. C07d 25/76
U.S. Cl. 260—326.13 R               9 Claims

ABSTRACT OF THE DISCLOSURE

The compounds are 3-(2-aminophenyl) indoles which are useful as anticonvulsant agents and central nervous system depressants. The compounds may also be used as intermediates in the preparation of pickling agents, mothproofing agents and wood preservatives. Representative of the compounds disclosed is 3-(2-acetamido-5-chloro)-phenylindole.

DETAILED DESCRIPTION

The novel compounds of the present invention have the following formula:

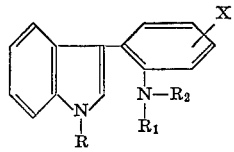

in which X is selected from a halogen such as chloro, fluoro or bromo, or trifluoromethyl, R is hydrogen, lower alkyl of 1 to 4 carbons, phenyl, an arlkyl of 7 to 13 carbon atoms, particularly a phenyl-lower alkyl such as benzyl, phenethyl and phenylisopropyl, a carboalkoxy group such as carboethoxy or carbopropoxy, $R_1$ is selected from lower alkyl or a phenyl-lower alkyl of 7 to 13 carbon atoms and $R_2$ is selected from $R_1$ or —COR or COOR.

The compounds of the present invention may be conveniently prepared by employing as the basic starting material a compound of the formula

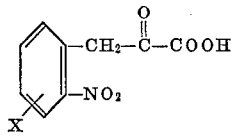

in which X is as previously defined and does not interfere with or partake in the reaction.

Representative of the 2-nitro-substitutde-phenylpyruvic acids which can be employed as starting materials are the following:

2-nitrophenylpyruvic acid,
2-nitro-5-chlorophenylpyruvic acid,
2-nitro-5-methoxyphenylpyruvic acid,
2-nitro-5-trifluoromethylphenylpyruvic acid, and
2-nitro-5-bromophenylpyruvic acid.

In the preferred method of preparation the 2-nitrophenylpyruvic acid is allowed to react with phenylhydrazine in acetic acid for a short period of time, 5 to 10 minutes, at an elevated temperature, approximately 90° C. Water is then added to the reaction mixture and the mixture stirred at about 70° C. for approximately one-half hour. The mixture is then cooled and filtered to yield the corresponding phenylhydrazone. The phenylhydrazone derivative is then added to a mixture of concentrated acid, preferably hydrochloric acid and glacial acetic acid, and the mixture refluxed for about 5 minutes, cooled and poured into water. The mixture is filtered and the filtered solids stirred with ether and water containing sodium hydroxide. The mixture is then filtered again and the aqueous phase discarded. The solids thus obtained are washed with ether, stirred with dilute hydrochloric acid and filtered to yield the 3-(2-nitrophenyl)indole carboxylic acid derivative. The ether layer is then dried, the ether removed, and the residue chromatographed on silica gel. The 3-(2-nitrophenyl)indole derivative is extracted from the silica gel by elution with benzene.

The 3-(2-nitrophenyl)indole derivative is then preferably dissolved in ethanol and reduced under hydrogen pressure in the presence of a suitable catalyst, such as 85% platinum oxide, to yield the corresponding 3-(2-aminophenyl)indole. The thus obtained amine base is then stirred with a mixture of pyridine and acetic anhydride for 2.5 hours at room temperature, the mixture diluted with water and extracted with benzene. Removal of the benzene yields a viscous oil from which, upon the addition of benzene, the desired 2-(3-indolyl)acetanilide crystallizes. The acetanilide may be purified by recrystallization from carbon tetrachloride.

If desired, the 3-(2-aminophenyl)indole derivative may be treated with benzoyl chloride in the presence of pyridine to form the corresponding 2-(3-indolyl)benzanilide, which may, if desired, be in turn treated with lithium aluminum hydride under reducing conditions and then with acetic anhydride to form the N-benzyl-2-(3-indolyl) acetanilide derivative.

The 3-(2-aminophenyl)indole derivative may also, if desired, be treated with ethyl chloroformate in the presence of pyridine in a nitrogen atmosphere at room temperature to form the corresponding ethyl-2-(3-indolyl) carbanilate derivative. The thus obtained carbanilate may then be treated with lithium aluminum hydride under anhydrous conditions to form the corresponding 3-(2-methylaminophenyl)indole which, if desired, can be treated with an acid anhydride, for example, acetic anhydride to form 2-(3-indolyl)-N-methylacetanilide or propionic anhydride to form 2-(3-indolyl)-N-methylpropionanilide. The 3-(2-methylaminophenyl)indole derivative may, if desired, also be treated with ethyl chloroformate to form the ethyl-2-(3-indolyl)-N-methylcarbanilate.

The above described process may be illustrated as follows:

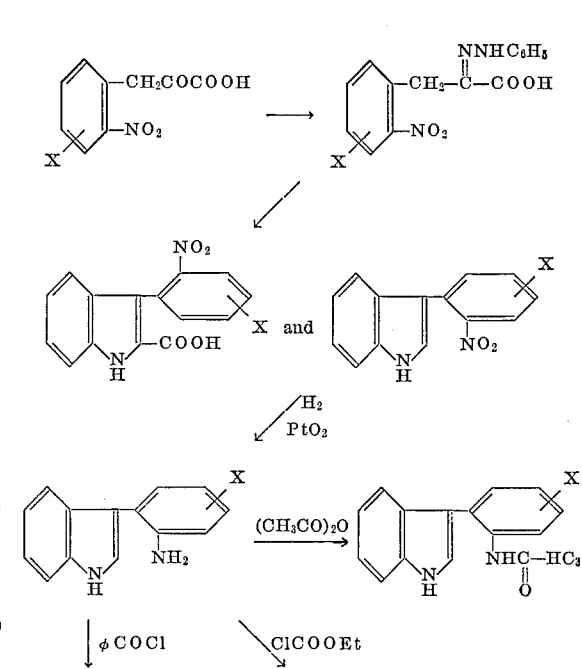

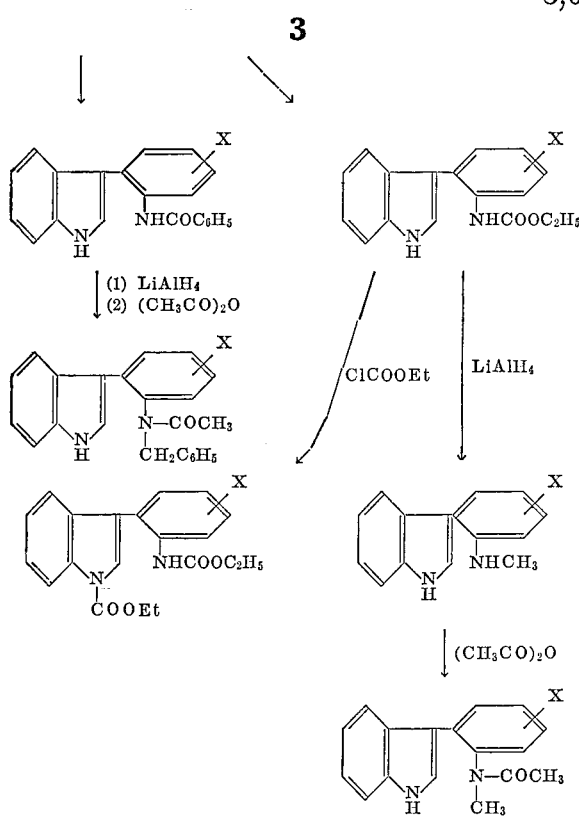

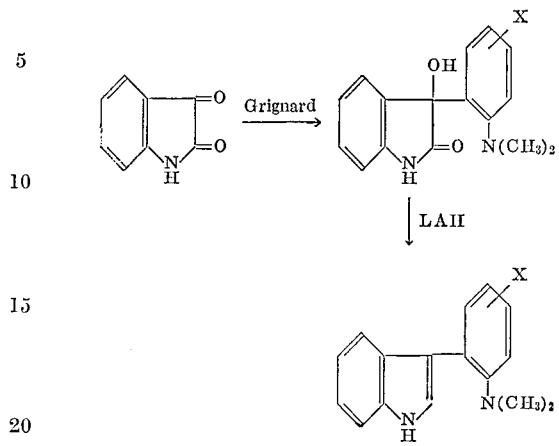

Representative of the compounds which may be prepared by the described processes are the following:

2-(3-indolyl)acetanilide,
4-chloro-2-(3-indolyl)acetanilide,
4-methoxy-2-(3-indolyl)acetanilide,
ethyl 2-(3-indolyl)carbanilate,
ethyl 4-chloro-2-(3-indolyl)carbanilate,
ethyl 2-(N-carboethoxy-3-indolyl)carbanilate,
ethyl 4-chloro-2-(N-carboethoxy-3-indolyl)carbanilate,
ethyl 4-methoxy-2-(N-carboethoxy-3-indolyl)carbanilate,
3-(2-methylaminophenyl)indole,
3-(5-chloro-2-methylaminophenyl)indole,
3-(5-methoxy-2-methylaminophenyl)indole,
3-(5-trifluoromethyl-2-methylaminophenyl)indole,
2-(3-indolyl)-N-methylacetanilide,
4-chloro-2-(3-indolyl)-N-methylacetanilide,
4-methoxy-2-(3-indolyl)-N-methylacetanilide,
4-trifluoromethyl-2-(3-indolyl)-N-methylacetanilide,
2-(3-indolyl)-N-methylpropionanilide,
4-chloro-2-(3-indolyl)-N-methylpropionanilide,
4-methoxy-2-(3-indolyl)-N-methylpropionanilide,
4-trifluoromethyl-2-(3-indolyl)-N-methylpropionanilide,
ethyl 4-chloro-2-(3-indolyl)-N-methyl carbanilate,
ethyl 4-methoxy-2-(3-indolyl)-N-methyl carbanilate,
2-(3-indolyl)benzanilide,
4-chloro-2-(3-indolyl)benzanilide,
4-methoxy-2-(3-indolyl)benzanilide,
4-trifluoromethyl-2-(3-indolyl)benzanilide,
N-benzyl-2-(3-indolyl)acetanilide,
N-benzyl-4-chloro-2-(3-indolyl)acetanilide,
N-benzyl-4-methoxy-2-(3-indolyl)acetanilide, and
N-benzyl-4-trifluoromethyl-2-(3-indolyl)acetanilide.

Tertiary amines in which $R_1$ and $R_2$ are methyl, such as 3-(2-dimethylaminophenyl)indole, may be prepared by treating a corresponding 2-bromo-aniline with paraformaldehyde and formic acid to form the 2-bromo-N,N-dimethylaniline derivative, preparing a Grignard reagent from that compound and magnesium and reacting the mixture with isatin to form the 3-(2-dimethylaminophenyl)dioxindole derivative, which upon treatment with lithium aluminum hydride, forms the desired 3-(2-dimethylaminophenyl)indole.

The above described processes may be illustrated as follows:

Representative of the compounds which may be prepared by the described process are the following:

3-(2-dimethylaminophenyl)dioxindole,
3-(5-chloro-2-dimethylaminophenyl)dioxindole,
3-(5-methoxy-2-dimethylaminophenyl)dioxindole,
3-(5-trifluoromethyl-2-dimethylaminophenyl)dioxindole,
3-(2-dimethylaminophenyl)indole,
3-(5-chloro-2-dimethylaminophenyl)indole,
3-(5-methoxy-2-dimethylaminophenyl)indole, and
3-(5-trifluoromethyl-2-dimethylaminophenyl)indole.

The novel compounds of the invention have been shown to possess anticonvulsant activity in animals. For example, the compound 3-(2-acetamido-5-chloro)phenyl indole has been shown in the standard animals tests to produce significant anticonvulsant activity as demonstrated by antimetrazol, antistrychnine and antielectroshock activity indicative of medullary depressant action and inhibition of synaptic transmission in the central nervous system when administered to mice in doses of 50 to 200 mg./kg. prior to drug challenge.

In behavioral screening tests the forementioned compound also exhibited a central nervous system depressent activity. In mice receiving 100–1,000 mg./kg. of the compound intraperitoneally in the form of a 5% acacia suspension, reactivity, posture, righting reflex and muscle tone was depressed. As a result of the behavioral tests the compound was found to have an $LD_{50}$ in excess of 1,000 mg./kg. The behavioral studies were conducted in accordance with the procedure set forth by Irwin in "Animal and Clinical Pharmacologic Techniques in Drug Evaluation," J. H. Nodine and P. E. Siegler, Ed., Year Book Publishers, Inc., 1964, pp. 36–54.

When they are intended for pharmaceutical use, it is preferred to combine the compounds with pharmaceutical additives such as diluents, flavoring agents, disintegrating agents, and the like, and form them into unit dosage forms. Especially preferred are tablets, capsules, suspensions for oral administration and sterile solutions for parenteral administration. Such dosage forms will normally contain about 10 to 250 mg. of the active ingredient.

A typical tablet can have the following composition:

|  | Mg. |
|---|---|
| 3-(2-acetamido-5-chloro)phenyl indole | 20 |
| Lactose U.S.P. | 136.5 |
| Corn starch | 20 |
| Corn starch (as 10% starch paste) | 3.4 |
| Magnesium stearate | 1.3 |

The tablets are formed using a 5/16 inch diameter punch for compression.

Capsules may be prepared by filling No. 3 hard gelatin capsules with the following ingredients:

| | Mg. |
|---|---|
| 3-(2-acetamido-5-chloro)phenyl indole | 20 |
| Lactose U.S.P. | 200 |
| Starch U.S.P. | 16 |
| Talc U.S.P. | 8 |

In clinical practice the daily dosage of the active ingredient may range from about 20 mg. to 500 mg. The exact amount, of course, will be conditioned upon the severity of the patient's condition and other factors taken in account in good medical practice.

The amine derivatives of the present invention are corrosion inhibitors which can be used in the chemical process industry where it is desired to protect ferrous materials which come in contact with corrosive acids and/or oxidizing agents in aqueous media.

The thiocyanic acid addition salts of the compounds of this invention, when condensed with formaldehyde, form resinous materials useful as pickling agents according to U.S. Pats. 2,425,320 and 2,606,155. The compounds also form fluosilicic acid addition salts which are useful as wood preservatives and mothproofing agents according to U.S. Pats. 1,915,334 and 2,075,539.

The compounds of the invention may also be used by those skilled in the art to prepare more complex chemical or pharmaceutical compounds.

The following examples illustrate the practice of the invention:

EXAMPLE 1

2-nitro-5-chlorophenylpyruvic acid

A mixture of 102.5 g. (0.6 mole) of 2-nitro-5-chlorotoluene and 87.6 g. (0.6 mole) of ethyl oxalate is added dropwise to a stirred solution of sodium ethoxide (from 14.4 g., 0.625 mole of sodium and 300 ml. of ethanol) cooled to 7° in an ice bath. After stirring 39 hours at room temperature, 500 ml. of water is added and the mixture steam distilled to remove unreacted nitrotoluene. The remaining aqueous solution is extracted with ether and acidified with 100 ml. of concentrated hydrochloric acid to give an oil which solidifies. After drying at 60°, 2-nitro-5-chlorophenylpyruvic acid is obtained, M.P. 152–154°. A sample recrystallized from benzene melts at 155–157°.

Analysis.—Calcd. for $C_9H_6ClNO_5$ (percent): C, 44.38; H, 2.48; Cl, 14.55; N, 5.75. Found (percent): C, 44.23; H, 2.67; Cl, 14.30; N, 5.85.

EXAMPLE 2

2-nitro-5-chlorophenylpyruvic acid phenylhydrazone

A solution of 98 g. (0.4 mole) of the pyruvic acid of Example 1 in 500 ml. of acetic acid at 90° is treated with 50 g. of freshly distilled phenylhydrazine. After 5 minutes, 500 ml. of water is added, the mixture stirred at 70° for 0.5 hour, cooled and the solids filtered to give, after drying, at 60°, 2-nitro-5-chlorophenylpyruvic acid phenylhydrazone, M.P. 175–180°. A sample recrystallized from nitromethane melts at 182–183.5°.

Analysis.—Calcd. for $C_{15}H_{12}ClN_3O_4$ (percent): C, 53.98; H, 3.62; Cl, 10.63; N, 12.59. Found (percent): C, 53.81; H, 3.75; Cl, 10.22; N, 12.48.

EXAMPLE 3

3-(5-chloro-2-nitrophenyl)indole-2-carboxylic acid and 3-(5-chloro-2-nitrophenyl)indole A mixture of 87 g. (0.26 mole) of phenylhydrazone, 260 ml. of concentrated hydrochloric acid and 650 ml. of glacial acetic acid is refluxed gently for 5 minutes, cooled and poured into 2 liters of water. The filtered solids were stirred for 1 hour with a mixture of 500 ml. of ether and 250 ml. of water containing 12 g. (0.3 mole) of sodium hydroxide. The mixture is filtered and the aqueous phase discarded. The solids obtained are washed well with ether and stirred for 1 hour with dilute hydrochloric acid. Filtration gives 3-(5-chloro-2-nitrophenyl)-indole-2-carboxylic acid, M.P. 293–294°.

Analysis.—Calcd. for $C_{15}H_9ClN_2O_4$ (percent): C, 56.88; H, 2.87; Cl, 11.20; N, 8.85. Found (percent): C, 56.68; H, 3.02; Cl, 10.95; N, 8.94.

The ether layer from above is dried over calcium chloride, the solvent removed and the residue chromatographed on 500 g. of silica gel. Elution with benzene gives 3-(5-chloro-2-nitrophenyl)indole, M.P. 153–155° after recrystallization from benzene-carbon tetrachloride (1:1).

Analysis.—Calcd. for $C_{14}H_9ClN_2O_2$ (percent): C, 61.66; H, 3.32; Cl, 13.00; N, 10.27. Found (percent): C, 61.25; H, 3.38; Cl, 13.10; N, 10.21.

EXAMPLE 4

3-(2-amino-5-chlorophenyl)indole hydrochloride

A solution of 22.5 g. (0.083 mole) of 3-(5-chloro-2-nitrophenyl)indole in 250 ml. of ethanol is reduced at an initial pressure of 50 lbs. with 0.3 g. of 85% platinum oxide. Uptake ceases after 1 hour, the catalyst is filtered and the solvent removed. The oily residue is treated with ether and insoluble solids filtered. The ether is removed from the filtrate and the residue dissolved in 150 ml. of isopropanol. Addition of 20 ml. of 6 N HCl gives 3-(2-amino-5-chlorophenyl)indole hydrochloride, M.P. 289–292°.

Analysis.—Calcd. for $C_{14}H_{12}Cl_2N_2$ (percent): C, 60.23; H, 4.34; N, 10.03. Found (percent): C, 60.81; H, 4.43; N, 10.03.

EXAMPLE 5

4-chloro-2-(3-indolyl)acetanilide

The oily amine base prepared from 6.1 g. of 3-(5-chloro-2-nitrophenyl)indole is stirred with a mixture of 25 ml. of pyridine and 3.0 ml. of acetic anhydride for 2.5 hours at room temperature and 5 minutes on a steam bath. The mixture is then diluted with 100 ml. of water and extracted with benzene. The benzene solution is washed with water, diluted with hydrochloric acid and water and dried over calcium chloride. Removal of the benzene gives a viscous oil which crystallizes when a small amount of benzene is added. Several recrystallizations from carbon tetrachloride give 4-chloro-2-(3-indolyl)acetanilide, M.P. 153–154°.

Analysis.—Calcd. for $C_{16}H_{13}ClN_2O$ (percent): C, 67.48; N, 4.60; Cl, 12.45; N, 9.84. Found (percent): C, 66.90; H, 4.75; Cl, 12.71; N, 10.24.

EXAMPLE 6

Ethyl 4-chloro-2-(3-indolyl)carbanilate

To an ice-cooled mixture prepared from 22.0 g. (0.079 mole) of 3-(2-amino-5-chlorophenyl)indole hydrochloride and 200 ml. of pyridine in a nitrogen atmosphere, 9.5 g. (0.088 mole) of ethyl chloroformate is added dropwise below 11°. After stirring at room temperature for 18 hours, 600 ml. of water is added and the oil which separates is extracted with 3 × 200 ml. portions of ether. The ether is washed with water and 3 N HCl. After drying over calcium chloride the ether is removed and the residue triturated with carbon tetrachloride to give ethyl 4-chloro-2-(3-indolyl)carbanilate, M.P. 144–146°.

Analysis.—Calcd. for $C_{17}H_{15}ClN_2O_2$ (percent): C, 64.87; H, 4.80; Cl, 11.27; N, 8.90. Found (percent): C, 64.92; H, 4.67; Cl, 11.20; N, 9.05.

EXAMPLE 7

Ethyl 4-chloro-2-(N-carbethoxy-3-indolyl)carbanilate

A mixture prepared from 20.9 g. (0.075 mole) of 3-(2-amino-5-chlorophenyl) indole hydrochloride, 27.3 g. (0.26 mole) of triethylamine and 250 ml. of benzene is treated with 21.5 g. (0.2 mole) of ethyl chloroformate and the mixture refluxed for 20 hours. The solvent is removed at reduced pressure, the residue treated with ether, the insoluble solids are filtered and the ether removed to give an oil. Chromatography on alumina and elution with benzene gives ethyl 4-chloro-2-(N-carbethoxy-3-indolyl)-carbanilate, M.P. 123–126°.

*Analysis.* — Calcd. for $C_{20}H_{19}ClN_2O_4$ (percent). C, 62.10; H, 4.95; Cl, 9.16; N, 7.24. Found (percent): C, 61.58; H, 5.14; Cl, 9.32; N, 7.30.

EXAMPLE 8

3-(5-chloro-2-methylaminophenyl)indole

A solution of 7.9 g. (0.025 mole) of ethyl 4-chloro-2-3-indolyl)carbanilate in 250 ml. of dry ether is added dropwise to a stirred mixture of 2.7 g. (0.075 mole) of lithium aluminum hydride and 250 ml. of dry ether. After 24 hours of reflux, the mixture is cooled in ice and decomposed with 10 ml. of water. After stirring overnight, the solids are filtered and the ether is removed. The residue is chromatographed on 250 g. of silica gel and the 3-(5-chloro-2-methylaminophenyl)indole eluted as a viscous oil.

*Analysis.*—Calcd. for $C_{15}H_{13}ClN_2$ (percent): C, 70.17; H, 5.10; N, 10.91. Found (percent): C, 68.20; H, 5.03; N, 10.59.

EXAMPLE 9

4-chloro-2-(3-indolyl)-N-methylacetanilide

A solution of 4.1 g. (0.016 mole) of 3-(5-chloro-2-methylaminophenyl)indole in 10 ml. of acetic anhydride is heated on a steam bath for 1 hour. The solution is diluted with 100 ml. of water and stirred until solids are formed. Filtration gives 4-chloro-2-(3-indolyl)-N-methylacetanilide, M.P. 174–181°. Recrystallization from carbon tetrachloride gives a purified sample which has a melting point of 181–183°.

*Analysis.*—Calcd. for $C_{17}H_{15}ClN_2O$ (percent): C, 68.33; H, 5.06; N, 9.38. Found (percent): C, 67.87; H, 4.92; N, 9.39.

EXAMPLE 10

4-chloro-2-(3-indolyl)-N-methylpropionanilide

A solution of 2.8 g. (0.011 mole) of 3-(5-chloro-2-methylaminophenyl)indole in 10 ml. of propionic anhydride is heated on a steam bath for 1 hour. The solution is diluted to 100 ml. with water and stirred until solids are formed. Filtration gives 4-chloro-2-(3-indolyl)-N-methylpropionanilide, M.P. 168–174°. Recrystallization from carbon tetrachloride gives a purified sample which has a melting point of 173 to 175°.

*Analysis.*—Calcd. for $C_{18}H_{17}ClN_2O$ (percent): C, 69.16; H, 5.47; N, 8.96. Found (percent): C, 69.18; H, 5.92; N, 8.93.

EXAMPLE 11

Ethyl 4-chloro-2-(3-indolyl)-N-methylcarbanilate

A solution of 2.8 g. (0.011 mole) of 3-(5-chloro-2-methylaminophenyl)indole in 10 ml. of pyridine is cooled in ice and treated with 1.2 ml. (0.0125 mole) of ethyl chloroformate. The mixture is stirred at room temperature for 18 hours and diluted with 100 ml. of water. The product is extracted into ether and the ether solution washed with dilute hydrochloric acid, water, 10% sodium hydroxide solution and water and dried with calcium chloride. Removal of the ether and recrystallization of the residue from methanol gives ethyl 4-chloro-2-(3-indoyly)-N-methylcarbanilate, M.P. 140–142°.

*Analysis.*—Calcd. for $C_{18}H_{17}ClN_2O_2$ (percent): C, 65.75; H, 5.21; Cl, 10.78; N, 8.52. Found (percent): C, 65.87; H, 4.94; Cl, 10.55; N, 8.55.

EXAMPLE 12

4-chloro-2-(3-indolyl)benzanilide

A mixture prepared from 2.79 g. (0.01 mole) of 3-(2-amino-5-chlorophenyl)indole hydrochloride and 20 ml. of pyridine in a nitrogen atmosphere is treated with 1.2 ml. (0.0103 mole) of freshly distilled benzoyl chloride. After stirring 16 hours at room temperature the mixture is diluted with 60 ml. of water and the solids which form extracted into ether. The solution is extracted with 6 N HCl, water, 10% sodium hydroxide and water and dried over calcium chloride. Removal of the solvent and recrystallization of the residue from benzene gives 4-chloro-2-(3-indolyl)benzanilide, M.P. 200–202°.

*Analysis.*—Calcd. for $C_{21}H_{15}ClN_2O$ (percent): C, 72.72; H, 4.36; Cl, 10.22; N, 8.07. Found (percent): C, 72.54; H, 4.38; Cl, 10.45; N, 7.80.

EXAMPLE 13

N-benzyl-4-chloro-2-(3-indolyl)acetanilide

A slurry of 3.3 g. (0.0096 mole) of 4-chloro-2-(3-indolyl) benzanilide in 100 ml. of dry ether is added all at once to a mixture of 0.5 g. (0.0132 mole) of lithium aluminum hydride in 50 ml. of dry ether. The mixture is refluxed for 6 hours, cooled in ice and decomposed with 1.5 ml. of water. After stirring overnight the solids are filtered and rinsed with chloroform. The solvents are removed and the residue triturated with 50 ml. of cyclohexane to give 1.6 g. of recovered starting material, M.P. 199–201°. The cyclohexane is evaporated from the filtrate and the oily residue heated on the steam bath for 1 hour with 10 ml. of acetic anhydride. The solution is diluted to 100 ml. with water and stirred until solids form. Filtration gives N-benzyl-4-chloro-2-(3 - indolyl)acetanilide, M.P. 220–231°. Recrystallization from ethanol raises the melting point to 233–235°.

*Analysis.*—Calcd. for $C_{23}H_{19}ClN_2O$ (percent): C, 73.70; H, 5.11; Cl, 9.46; N, 7.47. Found (percent): C, 73.64; H, 5.69; Cl, 9.35; N, 7.15.

EXAMPLE 14

2-bromo-4-chloro-N,N-dimethylaniline 2-bromo-4-chloroaniline (102 g., 0.5 mole) is added in portions to a mixture of 37.5 g. (1.25 mole) of paraformaldehyde and 71 g. (1.5 mole) of 97% formic acid while heating on a steam bath. Heating is continued for 2 hours, the mixture is diluted with 2 liters of water and the oil which separates extracted into chloroform. After drying over calcium chloride the solvent is removed and the residue distilled to give 2-bromo-4-chloro-N,N-dimethylaniline, B.P. 101–104°/1.3 mm.

*Analysis.*—Calcd. for $C_8H_9BrClN$ (percent): C, 40.98; H, 3.87; Br, 34.08; Cl, 15.12; N, 5.97. Found (percent): C, 41.14; H, 4.06; Br, 33.78; Cl, 15.20; N, 6.14.

EXAMPLE 15

3-(5-chloro-2-dimethylaminophenyl)dioxindole

Isatin (48.6 g., 0.33 mole) is added in portions to the Grignard reagent prepared from 234 g. (1.0 mole) of 2-bromo-4-chloro-N,N-dimethylaniline, 24.3 g. (0.1 mole) of magnesium and 2 liters of ether. The mixture is refluxed for 43 hours, cooled and decomposed with 500 ml. of water followed by a mixture of 150 ml. of glacial acetic acid and 350 ml. of water. The ether layer is separated, the ether removed and the residue stirred with 250 ml. 10% hydrochloric acid. The solids are filtered, washed with acetone and then suspended in dilute potassium carbonate solution. Filtration and recrystallization from benzene gives 3-(5 - chloro - 2 - dimethylaminophenyl)dioxindole, M.P. 224–226°. Another recrystallization from benzene raises the melting point to 225–226°.

*Analysis.*—Calcd. for $C_{16}H_{16}ClN_2O_2$ (percent): C, 63.26; H, 5.31; N, 9.23. Found (percent): C, 63.04; H, 5.03; N, 9.32.

EXAMPLE 16

3-(5-chloro-2-dimethylaminophenyl)indole 3-(5-chloro-2-dimethylaminophenyl)dioxindole (3.0 g., 0.01 mole) is added by means of a Soxhlet apparatus, to a suspension of 4.8 g. (0.13 mole) of lithium aluminum hydride in 300 ml. of dry ether over a period of 6 hours. The reaction mixture is cooled in ice and treated successively with 10 ml. of ethyl acetate, 10 ml. of water and 5 ml. of acetic acid. After stirring overnight, the solids are filtered and the ether evaporated. The residue, on trituration with cyclohexane, gives 3-(5-chloro-2-dimethylaminophenyl)indole, M.P. 119–122°. Recrystallization from petroleum ether gives M.P. 121–122°.

*Analysis.*—Calcd. for $C_{16}H_{15}ClN_2$ (percent): C, 70.97; H, 5.59; Cl, 13.10; N, 10.35. Found (percent): C, 71.05; H, 5.54; Cl, 13.06; N, 10.15.

We claim:

1. A compound selected from compounds of the formula

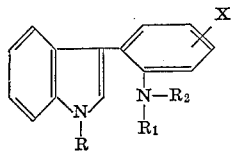

in which X is halogen or trifluoromethyl, R is hydrogen, lower alkyl, phenyl-lower alkyl or carbethoxy, $R_1$ is hydrogen, lower alkyl or phenyl-lower alkyl, $R_2$ is selected from hydrogen, lower alkyl, —$COCH_3$, —$COC_6H_5$ and $COOC_2H_5$, and pharmaceutically acceptable salts thereof.

2. A compound of claim 1 in which X is chloro, R, $R_1$, and $R_2$ are hydrogen.
3. A compound of claim 1 in which R and $R_1$ are hydrogen and $R_2$ is $COOC_2H_5$.
4. A compound of claim 1 in which X is chloro, $R_1$ is hydrogen and R and $R_2$ are carboethoxy.
5. A compound of claim 1 in which X is chloro, R and $R_1$ are hydrogen and $R_2$ is methyl.
6. A compound of claim 1 in which X is chloro, R and $R_1$ are hydrogen and $R_2$ is —$COC_6H_5$.
7. A compound of claim 1 in which R is hydrogen, X is chloro, $R_1$ is methyl and $R_2$ is —$COCH_3$.
8. A compound of claim 1 in which X is halo.
9. A compound of claim 1 in which R is hydrogen, lower alkyl or phenyl-lower alkyl.

References Cited

UNITED STATES PATENTS 3,215,705  11/1965  Allen _____ 260—326.15

ALEX MAZEL, Primary Examiner

J. A. NARCAVAGE, Assistant Examiner

U.S. Cl. X.R.

252—148, 401; 260—319.1, 326.14 R, 326.15; 424—274